United States Patent
Lee et al.

(10) Patent No.: US 12,115,873 B2
(45) Date of Patent: Oct. 15, 2024

(54) METHOD AND DEVICE FOR ESTIMATING POSE OF ELECTRIC VEHICLE CHARGING SOCKET AND AUTONOMOUS CHARGING ROBOT EMPLOYING THE SAME

(71) Applicants: HYUNDAI MOTOR COMPANY, Seoul (KR); KIA CORPORATION, Seoul (KR)

(72) Inventors: Min Kyu Lee, Hwaseong-si (KR); Byung Ho Yoon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 259 days.

(21) Appl. No.: 17/698,352

(22) Filed: Mar. 18, 2022

(65) Prior Publication Data

US 2023/0102948 A1    Mar. 30, 2023

(30) Foreign Application Priority Data

Sep. 29, 2021   (KR) .......................... 10-2021-0129254

(51) Int. Cl.
*B60L 53/37* (2019.01)
*B25J 9/16* (2006.01)
(Continued)

(52) U.S. Cl.
CPC .............. *B60L 53/37* (2019.02); *B25J 9/163* (2013.01); *B25J 9/1687* (2013.01); *B25J 9/1697* (2013.01);
(Continued)

(58) Field of Classification Search
CPC . B60L 53/37; B60L 53/16; B25J 9/163; B25J 9/1687; B25J 9/1697; B25J 13/08;
(Continued)

(56) References Cited

U.S. PATENT DOCUMENTS

2022/0331964 A1* 10/2022 Spector .................. B25J 13/084
2022/0355692 A1* 11/2022 Hetrich .................... G06N 3/08

FOREIGN PATENT DOCUMENTS

WO     2021/155308 A1    8/2021

OTHER PUBLICATIONS

B.Chen, et al., "MnasFPN: Learning Latency-Aware Pyramid Architecture for Object Detection on Mobile Devices," CVPR2020, Jun. 17, 2020, https:/openaccess.thecvf.com/CVPR2020.
(Continued)

*Primary Examiner* — Rachid Bendidi
(74) *Attorney, Agent, or Firm* — Morgan, Lewis & Bockius LLP

(57) ABSTRACT

The present disclosure provides is a method and device for accurately estimating a pose of a charging socket of an electric vehicle regardless of a shape of the charging socket, so that an electric vehicle charging robot may precisely move a charging connector toward the charging socket of the electric vehicle and couple the charging connector to the charging socket. According to an aspect of an exemplary embodiment, a method of estimating the pose of the charging socket of an electric vehicle includes: acquiring an RGB image and a depth map of the charging socket; detecting a keypoint of the charging socket based on the RGB image; deriving a first estimated pose of the charging socket based on the depth map; and deriving a second estimated pose of the charging socket based on the keypoint of the charging socket and the first estimated pose.

19 Claims, 14 Drawing Sheets

(51) Int. Cl.
*B25J 13/08* (2006.01)
*B60L 53/16* (2019.01)
*G06N 3/08* (2023.01)
*G06T 7/73* (2017.01)

(52) U.S. Cl.
CPC .............. *B25J 13/08* (2013.01); *B60L 53/16* (2019.02); *G06N 3/08* (2013.01); *G06T 7/73* (2017.01); *G05B 2219/40269* (2013.01); *G06T 2207/10024* (2013.01); *G06T 2207/10028* (2013.01); *G06T 2207/20081* (2013.01); *G06T 2207/20084* (2013.01)

(58) Field of Classification Search
CPC ........ B25J 9/1679; B25J 9/161; B25J 9/1664; B25J 9/1684; G06N 3/08; G06T 7/73; G06T 2207/10024; G06T 2207/10028; G06T 2207/20081; G06T 2207/20084; G06T 2207/30244; G06T 7/50; G05B 2219/40269; G05B 2219/40532; Y02T 10/70; Y02T 10/7072; Y02T 90/12; Y02T 90/14; B60Y 2200/91
See application file for complete search history.

(56) References Cited

OTHER PUBLICATIONS

A. Howard, et al., "Searching for MobileNetV3," ICCV2019, Nov. 20, 2019, https://arxiv.org/abs/1905.02244.

X. Dong, et al., "Supervision-by-Registration: An Unsupervised Approach to Improve the Precision of Facial Landmark Detectors," CVPR2018, Jun. 19, 2018, https://openaccess.thecvf.com/CVPR2018.

J. Miseikis et al., "3D Vision Guided Robotic Charging Station for Electric and Plug-in Hybrid Vehicles," arXiv.org, Cornell University Library, Mar. 15, 2017.

J. Peng et al., "An Autonomous Pose Measurement Method of Civil Aviation Charging Port Based on Cumulative Natural Feature Data," IEEE Sensors Journal, vol. 19, No. 23, Dec. 1, 2019, pp. 11646-11655.

P. Quan et al., "Research on Fast Identification and Location of Contour Features of Electric Vehicle Charging Port in Complex Scenes," IEEE Access, vol. 10, Jun. 13, 2021, pp. 26702-26714.

S. Bruno et al., "Visual Servoing," in "Robotics: Modelling, Planning and Control," Dec. 31, 2009 Springer, UK, pp. 407-467.

"A new machine vision highlight: MVTec HALCON 18.11 to be released on Nov. 30", Oct. 2, 2018.

* cited by examiner

Distance: 40cm
(GT|RGB|RGB-D) [Pitch] -10.0|-11.3|-12.2  [Yaw] +15.0|+8.5|+16.5

Distance: 40cm
(GT|RGB|RGB-D) [Pitch] -10.0|-10.1|-12.0  [Yaw] +15.0|+15.7|+17.3

METHOD AND DEVICE FOR ESTIMATING POSE OF ELECTRIC VEHICLE CHARGING SOCKET AND AUTONOMOUS CHARGING ROBOT EMPLOYING THE SAME

CROSS-REFERENCE TO RELATED APPLICATION

The present application claims the priority to Korean Patent Application No. 10-2021-0129254, filed on Sep. 29, 2021 with the Korean Intellectual Property Office (KIPO), the entire content of which is incorporated herein by reference.

BACKGROUND

1. Technical Field

The present disclosure relates to a method and device for charging an electric vehicle and, more particularly, to a method and device for estimating a pose of an electric vehicle charging socket using an image. Additionally, the present disclosure relates to a charging robot employing the method and device for estimating the pose of the electric vehicle charging socket.

2. Related Art

With rapid developments in electric vehicle-related technologies, electric vehicles are becoming more popular and charging infrastructure is being expanded widely. When an electric vehicle is to be charged by a conductive charging scheme at a charging station, a charging connector attached to a front end of a charging cable is drawn out from an electric vehicle supply equipment (EVSE) and moved and/or rotated to extend to the electric vehicle and coupled to a charging socket of the electric vehicle, and then electric power is transferred to the electric vehicle.

Efforts to develop electric vehicle charging robots capable of automatically moving the charging connector and facilitating a support of the cable are underway. In order for an electric vehicle charging robot to accurately move the charging connector toward the charging socket of the electric vehicle and couple the charging connector to the charging socket, it is required to recognize not only a distance from the charging connector to the charging socket but also an orientation of the charging socket. However, it is very difficult to accurately estimate the orientation of the charging socket based on an image due to a variety of types of the charging sockets as well as a complex shape of each charging socket having a plurality of inlets.

The information disclosed in the Background section above is to aid in the understanding of the background of the present disclosure, and should not be taken as acknowledgement that this information forms any part of prior art.

SUMMARY

To solve the above problems, provided is a method of accurately estimating a pose of a charging socket of an electric vehicle regardless of a shape of the charging socket, so that an electric vehicle charging robot may precisely move a charging connector toward the charging socket of the electric vehicle and couple the charging connector to the charging socket.

Provided is a device for accurately estimating the pose of the charging socket of the electric vehicle regardless of the shape of the charging socket, so that the electric vehicle charging robot may precisely move the charging connector toward the charging socket of the electric vehicle and couple the charging connector to the charging socket.

Provided is an autonomous electric vehicle charging robot capable of accurately estimating the pose of the charging socket of the electric vehicle regardless of the shape of the charging socket and precisely coupling the charging connector to the charging socket of the electric vehicle.

According to an aspect of an exemplary embodiment, provided is a method of estimating a pose of a charging socket of an electric vehicle in an autonomous electric vehicle charging robot. The method includes: acquiring, by a processor, an RGB image and a depth map of the charging socket; detecting, by the processor, a keypoint of the charging socket based on the RGB image; deriving, by the processor, a first estimated pose of the charging socket based on the depth map; and deriving, by the processor, a second estimated pose of the charging socket based on the keypoint of the charging socket and the first estimated pose.

The operation of detecting the keypoint of the charging socket based on the RGB image may include: detecting a bounding box surrounding the charging socket, calculating a confidence score for coordinates of the bounding box, and determining a class indicating a type of the charging socket by a learnable charging socket detection neural network; and detecting the keypoint inside a charging socket region in the bounding box by a learnable keypoint detection neural network.

The charging socket detection neural network may include a MobileNetV3 as a backbone and a MnasFPN as a detection head.

The operation of detecting the bounding box surrounding the charging socket may include removing at least one bounding box overlapping another bounding box among a plurality of bounding boxes detected by the charging socket detection neural network by a non-maximum suppression.

The keypoint detection neural network may detect the keypoint based on a single RGB image and the bounding box by using only a convolutional pose machine during an actual operation after a learning.

The operation of deriving the first estimated pose of the charging socket based on the depth map may include: correcting the depth map of the charging socket; deriving an equation of a plane of the charging socket by sampling a plurality of points inside a corrected depth map; projecting the keypoint of the charging socket onto the plane to acquire projected coordinates; acquiring reference coordinates corresponding to the projection coordinates from a CAD model of the charging socket; and acquiring an initial transformation matrix minimizing an objective function expressed by a following equation.

$$[R, t] = \operatorname*{argmin}_{R,t} \sum_{i=1}^{n} w_i \| Rq_i + t - p_i \|^2$$

The operation of deriving the second estimated pose of the charging socket may include deriving an optimal transformation matrix minimizing an objective function expressed by a following equation using the initial transformation matrix as an initial value.

$$[R^*, t^*] = \operatorname*{argmin}_{R^*, t^*} \sum_{i=1}^{n} \| K[R^* \mid t^*] q_i - y_i \|^2$$

According to another aspect of an exemplary embodiment, provided is a device for estimating a pose of a charging socket of an electric vehicle in an autonomous electric vehicle charging robot. The device includes a processor and a memory storing program instructions executable by the processor. When executed by the processor, the program instructions cause the processor to acquire an RGB image and a depth map of the charging socket; detect a keypoint of the charging socket based on the RGB image; derive a first estimated pose of the charging socket based on the depth map; and derive a second estimated pose of the charging socket based on the keypoint of the charging socket and the first estimated pose.

The program instructions causing the processor to detect the keypoint of the charging socket based on the RGB image may include instructions causing the processor to: detect a bounding box surrounding the charging socket, a confidence score for coordinates of the bounding box, and a class indicating a type of the charging socket by a learnable charging socket detection neural network; and detect the keypoint inside a charging socket region in the bounding box by a learnable keypoint detection neural network.

The charging socket detection neural network may include a MobileNetV3 as a backbone and a MnasFPN as a detection head.

The program instructions causing the processor to detect the bounding box surrounding the charging socket may include instructions causing the processor to remove at least one bounding box overlapping another bounding box among a plurality of bounding boxes detected by the charging socket detection neural network by a non-maximum suppression.

The keypoint detection neural network may detect the keypoint based on a single RGB image and the bounding box by using only a convolutional pose machine during an actual operation after a learning.

The program instructions causing the processor to derive the first estimated pose of the charging socket based on the depth map may include instructions causing the processor to: correct the depth map of the charging socket; derive an equation of a plane of the charging socket by sampling a plurality of points inside a corrected depth map; project the keypoint of the charging socket onto the plane to acquire projected coordinates; acquire reference coordinates corresponding to the projection coordinates from a CAD model of the charging socket; and acquire an initial transformation matrix minimizing an objective function expressed by a following equation.

$$[R, t] = \mathop{\mathrm{argmin}}_{R,t} \sum_{i=1}^{n} w_i \|Rq_i + t - p_i\|^2$$

The program instructions causing the processor to derive the second estimated pose of the charging socket may include instructions causing the processor to derive an optimal transformation matrix minimizing an objective function expressed by a following equation using the initial transformation matrix as an initial value.

$$[R^*, t^*] = \mathop{\mathrm{argmin}}_{R^*,t^*} \sum_{i=1}^{n} \|K[R^* \mid t^*]q_i - y_i\|^2$$

According to an aspect of an exemplary embodiment, an autonomous electric vehicle charging robot includes: a manipulator having six degrees of freedom and configured to be controllable to insert a charging connector installed at a front end into a charging socket of an electric vehicle; an image acquirer configured to acquire an RGB image and a depth map of the charging socket; and a robot controller configured to estimate a pose of the charging socket, determine a driving angle of each joint of the manipulator based on an estimated pose of the charging socket, determine whether the charging connector and the charging socket are aligned with each other, and control the manipulator.

The robot controller may include: a processor and a memory storing program instructions executable by the processor, wherein the program instructions, when executed by the processor, cause the processor to: acquire an RGB image and a depth map of the charging socket through the image acquirer; detect a keypoint of the charging socket based on the RGB image; derive a first estimated pose of the charging socket based on the depth map; and derive a second estimated pose of the charging socket based on the keypoint of the charging socket and the first estimated pose.

According to an exemplary embodiment, the pose of the charging socket of the electric vehicle may be estimated precisely based on images acquired by a three-dimensional (3D) camera. The estimation device may be implemented economically because the device may be configured using a low-cost 3D camera without any additional sensor. In addition, the estimation method of the present disclosure is applicable regardless of the shape of the charging socket.

According to another exemplary embodiment, a time required for moving the charging connector toward the charging socket of the electric vehicle to couple the charging connector to the charging socket may be reduced since the robot arms may be actuated based on an accurate pose information of the charging socket, which may enhance an operational efficiency of the charging robot.

BRIEF DESCRIPTION OF THE DRAWINGS

In order that the disclosure may be well understood, there will now be described various forms thereof, given by way of example, reference being made to the accompanying drawings, in which.

Figure 1:
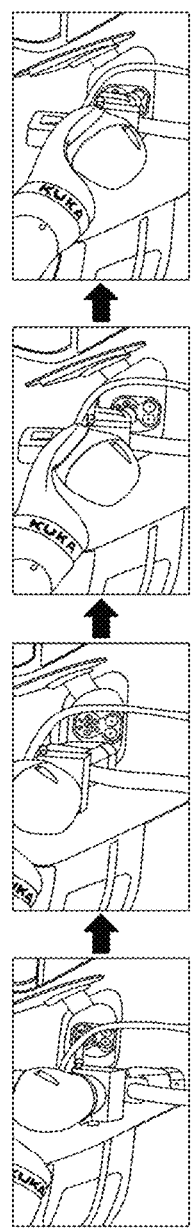
FIG. 1 illustrates a movement of a charging connector of an autonomous electric vehicle charging robot during a charging process according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the present disclosure, expressions "at least one of A and B" and "at least one of A or B" may mean a group consisting of: "A", "B", or "both A and B". Also, expressions "one or more of A and B" and "one or more of A or B" may mean a group consisting of: "A", "B", or "both A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Spatially relative terms such as "below", "beneath", "lower", "above", "upper", and so on may be used to easily describe a relative position or direction with respect to a component. The terms, however, should not be regarded to designate an absolute position or direction of related objects. For example, when a component shown in the drawing is turned over, a component described to be placed "below" or "beneath" another component may be placed "above" or "on" the other component. Accordingly, the preposition "below", for example, may include both directions of "below" and "above". Thus, the prepositions of places and direction usage may also be constructed to indicate another positions or directions, and the components in the descriptions of positions and directions may be constructed to be in the other positions and directions or orientations.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In the following description and the accompanied drawings, detailed descriptions of well-known functions or configuration that may obscure the subject matter of the present disclosure will be omitted for simplicity. Also, it is to be noted that the same components are designated by the same reference numerals throughout the drawings.

FIG. 1 illustrates a movement of a charging connector of an autonomous electric vehicle charging robot during a charging process. The autonomous charging robot may recognize a pose of a charging socket of an electric vehicle parked in a charging station. In this specification including the appended claims, the term "pose" of the charging socket is used to refer at least an orientation of the charging socket. Also, the term "pose" may be used to refer the orientation as well as a relative position of the charging socket. The autonomous charging robot may control its robot joints to automatically move a charging connector of the charging robot so that the charging connector is coupled to the charging socket of the electric vehicle without a manipulation of an operator. The movement of the charging connector may include a translation and rotation. For example, as shown in FIG. 1, the autonomous charging robot may translate the charging connector to a front of the charging socket of the electric vehicle, rotate the charging connector to face the charging socket, and then translate the charging connector forward again to be coupled to the charging socket.

Figure 2:
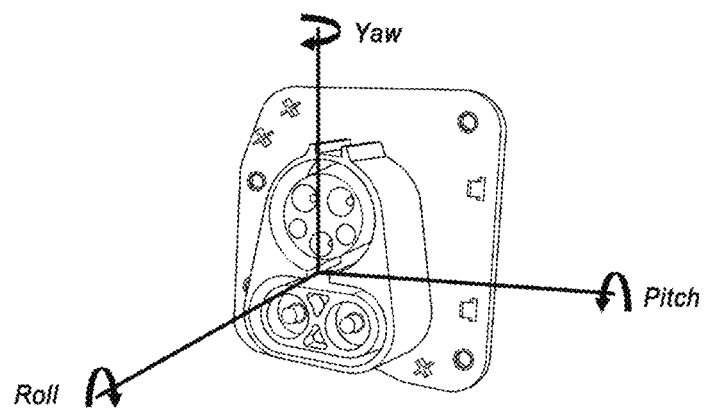
FIG. 2 shows an example of rotation angle values that may be used to represent an orientation of a charging socket of an electric vehicle.
Figure 3:
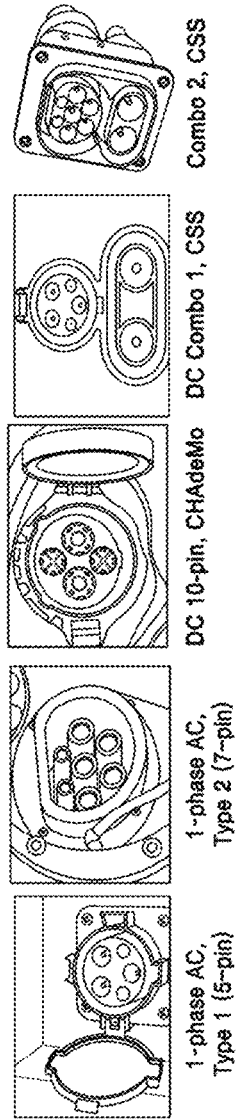
FIG. 3 shows examples of several types of the charging socket of the electric vehicle.

In order to couple the charging connector to the charging socket as shown in FIG. 1 precisely and safely, the autonomous charging robot should be able to accurately recognize the pose of the charging socket of the electric vehicle in addition to a type and shape of the charging socket and a distance from the charging connector to the charging socket. The pose, in particular, the orientation, of the charging socket may be represented by rotational angle values with respect to three axes, i.e., a roll, a pitch, and a yaw as shown in FIG. 2. However, there exist various types of charging sockets as shown in FIG. 3 depending on their applications according to relevant industrial standards such as IEC 62196 (Plugs, socket-outlets, vehicle connectors and vehicle inlets—Conductive charging of electric vehicles) standard established by International Electrotechnical Commission (IEC), J1772 (SAE Electric Vehicle and Plug in Hybrid Electric Vehicle Conductive Charge Coupler) standard established by SAE International, IEEE Standard Technical Specifications of a DC Quick Charger for Use with Electric Vehicles ('CHAdeMO') standard established by IEEE, Combined Charging System (CCS) 1.0 Specification established by European and North American automotive manufacturers. The variety of the types of the charging sockets makes it more difficult to recognize the pose of the charging socket and may require a plurality of devices for recognizing the pose of the charging socket to be prepared in each charging station. Thus, it is needed to develop a versatile device capable of recognizing the pose including the relative position and the orientation of the charging socket regardless of the type of charging socket.

Figure 4:
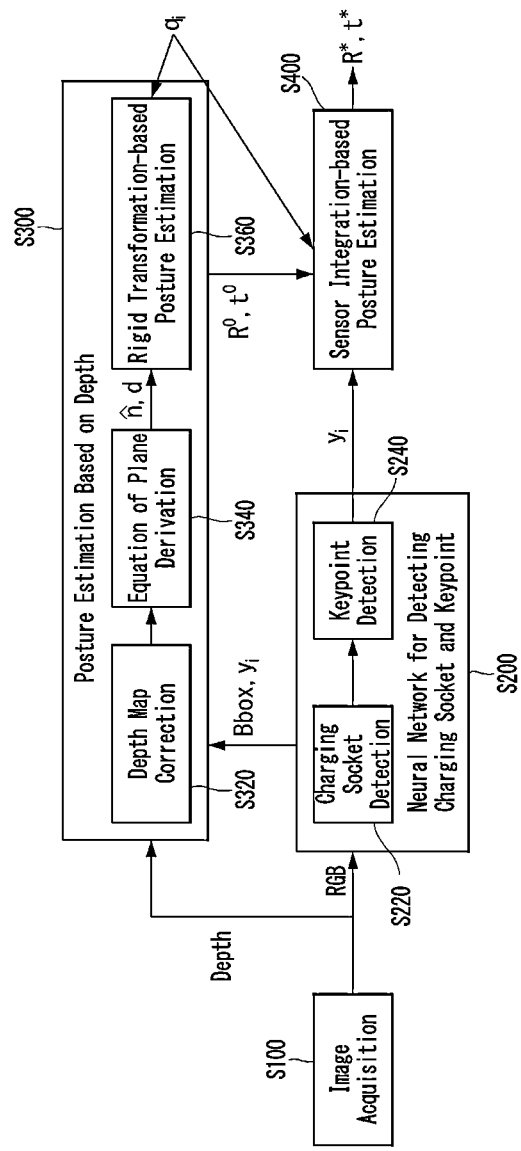
FIG. 4 a block diagram illustrating a process of estimating the pose of the charging socket of the electric vehicle according to an exemplary embodiment of the present disclosure.

FIG. 4 a block diagram illustrating a process of estimating a pose of a charging socket of an electric vehicle according to an exemplary embodiment of the present disclosure. According to the method of estimating the pose of the charging socket shown in FIG. 4, an estimation device may determine an optimal pose of the charging socket of the electric vehicle based on an RGB image and a depth map of the charging socket which may be acquired based on images received from an image sensor (S100) by detecting a charging socket and at least one keypoint of the charging socket in the RGB image (S200), determining a first estimated pose of the charging socket based on the depth map (S300), and determining a second estimated pose of the charging socket by taking into account the keypoint of the charging socket and the first estimated pose (S400). Here, the image sensor may include a three-dimensional (3D) camera such as a stereoscopic camera.

Figure 5A:
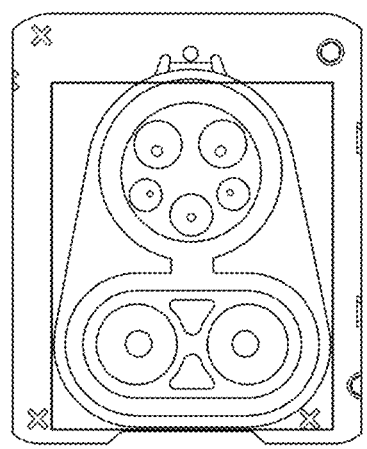
FIG. 5A shows an example of the bounding box set in an RGB image according to an exemplary embodiment of the present disclosure.
Figure 5B:
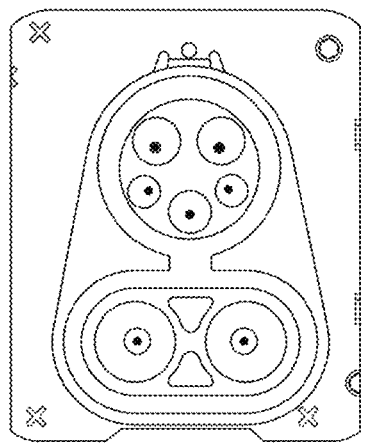
FIG. 5B shows an example of key points of the charging socket of the electric vehicle detected according to an exemplary embodiment of the present disclosure.

In the operation S200, the charging socket may be detected within a bounding box after the bounding box is set in the RGB image (S220). In addition, the keypoint ($y_i$) of the charging socket may be detected using the depth map and the bounding box (S240). The setting of the bounding box and the detection of the keypoint ($y_i$) may be performed by an artificial neural network. FIG. 5A shows an example of the bounding box set in the RGB image according to an exemplary embodiment of the present disclosure, and FIG. 5B is shows an example of the key points of the charging socket of the electric vehicle detected according to an exemplary embodiment of the present disclosure.

The artificial neural network may include a charging socket detection neural network and a keypoint detection neural network. The charging socket detection neural network may be a convolutional neural network (CNN) using the RGB image as an input. Also, the keypoint detection neural network may be a CNN using the RGB image as an input. The neural network for detecting the charging socket and the keypoint may be configured in a form of a cascade of two separate networks, that is, the charging socket detection neural network and the keypoint detection neural network.

The charging socket detection neural network may be learnable, and may generate a charging socket detection model through a learning. In an exemplary embodiment, the charging socket detection neural network may have a structure in which MobileNetV3 (A, Howard et al., *Searching for MobileNetV3*, Proceedings of the IEEE/CVF International Conference on Computer Vision (ICCV), 2019, pp. 1314-1324) is employed as a backbone and MnasFPN (Bo Chen et al., *MnasFPN: Learning Latency-Aware Pyramid Architecture for Object Detection on Mobile Devices*, Proceedings of the IEEE/CVF Conference on Computer Vision and Pattern Recognition (CVPR), 2020, pp. 13607-13616) is employed as a detection head.

Figure 6:
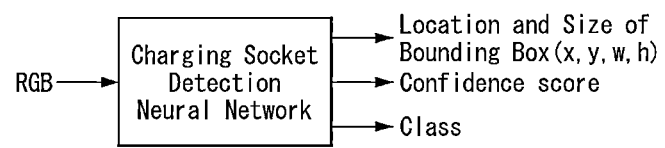
FIG. 6 illustrates input and output of a charging socket detection model according to an exemplary embodiment of the present disclosure.

During a learning or training process for the charging socket detection neural network, data augmentation may be performed first on the RGB image to increase an amount of training data by adding slightly modified copies of existing data or newly created synthetic data from the existing data and thereby to increase a performance of a neural network model. Afterwards, the augmented data is fed to the charging socket detection neural network, so that the charging socket detection neural network processes the augmented data to set the bounding box, detect the charging socket within the bounding box, and calculate a confidence score indicating a similarity between the detected charging socket image and an actual charging socket image. The charging socket detection neural network may generate a location and size of the bounding box, the confidence score, and a class indicating the type of the charging socket as shown in FIG. 6.

The bounding box of the charging socket may be derived by optimizing a first objective function expressed by Equation 1 based on the information on the bounding box and the class, and ground truth by the charging socket detection neural network.

$$L(x, c, l, g) = \frac{1}{N}(L_{conf}(x, c) + \alpha L_{loc}(x, l, g)) \quad \text{[Equation 1]}$$

The first objective function may be interpreted as a combination of a first loss function expressed by Equation 2 and related with a classification loss for the class information and a second loss function expressed by Equation 3 and related with a regression loss for the bounding box.

$$L_{conf}(x, c) = -\sum_{i \in Pos}^{N} x_{ij}^p \log(\hat{c}_i^p) - \sum_{i \in Neg} \log(\hat{c}_i^0) \quad \text{[Equation 2]}$$

$$\text{where } \hat{c}_i^p = \frac{\exp(c_i^p)}{\sum_p \exp(c_i^p)}$$

$$L_{loc}(x, l, g) = \sum_{i \in Pos}^{N} \sum_{m \in \{cx, cy, w, h\}} x_{ij}^k \text{smooth}_{L1}(l_i^m - \hat{g}_i^j) \quad \text{[Equation 3]}$$

$$\text{where } \text{smooth}_{L1}(x) = \begin{cases} 0.5x^2 & \text{if } |x| < 1 \\ |x| - 0.5 & \text{otherwise} \end{cases}$$

The charging socket detection model generated through such a training process enables to derive a plurality of bounding boxes based on the RGB image acquired based on the images from the image sensor. Some bounding boxes overlapping another ones among the plurality of bounding boxes may be removed by a non-maximum suppression (NMS) algorithm, for example.

Figure 7:
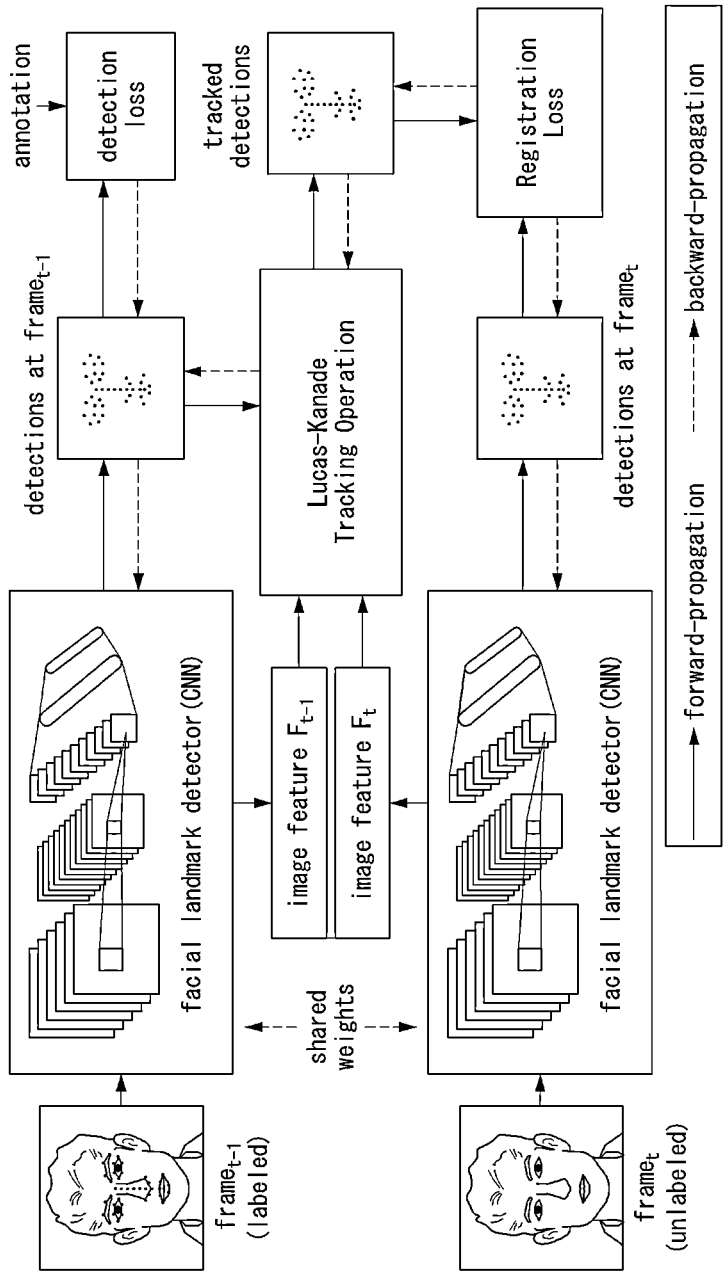
FIG. 7 is a block diagram of a model for detecting the keypoint of the electric vehicle charging socket according to an exemplary embodiment of the present disclosure.

FIG. 7 is a block diagram of a model for detecting the keypoint of the electric vehicle charging socket according to an exemplary embodiment of the present disclosure. The keypoint detection neural network may include a convolutional pose machine (CPM) as a backbone and may use a learnable optical flow operation module to estimate a motion between frames. The optical flow operation module may be a Lucas-Kanade optical flow algorithm.

The keypoint detection neural network may be learnable, and may generate a keypoint detection model through a learning. During a learning process, the keypoint detection neural network may receive two consecutive frames from the sensor and derive coordinates of the keypoint ($y_i$) of the charging socket based on the received frames by the convolutional pose machine. Here, earlier one of the two consecutive frames may be referred to as a first frame while the other frame may be referred to as a second frame. The first frame may be labeled but the second frame may not be labeled. A third loss function expressed by Equation 4 may be calculated based on the coordinates of the keypoints output by the convolutional pose machine for the first frame and ground truth coordinates.

$$l_{det} = \|L - L^*\|_2^2 \qquad \text{[Equation 4]}$$

The coordinates of the keypoint in the second frame may be estimated by Equation 5 by applying the coordinates of the keypoint in the first frame and feature maps of the first and second frames to the optical flow module.

$$l_{regi}^t = \sum_{i=1}^{K} \beta_{t,i} \|L_{t,i} - \hat{L}_{t,i}\|_2$$
$$= \sum_{i=1}^{K} \beta_{t,i} \|L_{t,i} - G(F_{t-1}, F_t, L_{t-1,i})\|_2 \qquad \text{[Equation 5]}$$

Finally, the keypoint detection model may be generated by performing the learning such that the second objective function expressed by Equation 6 is optimized.

$$l_{final} = \sum_{n=1}^{N} l_{det}^n + \gamma \sum_{t=1}^{T-1} l_{regi}^t \qquad \text{[Equation 6]}$$

Figure 8:
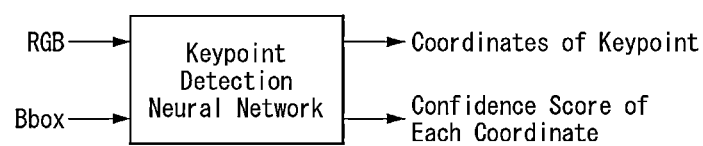
FIG. 8 illustrates input and output of the keypoint detection model during an operation of the keypoint detection neural network according to an exemplary embodiment of the present disclosure.

FIG. 8 illustrates input and output of the keypoint detection model during an operation of the keypoint detection neural network according to an exemplary embodiment of the present disclosure. During the operation after the learning is completed, the keypoint detection model may receive a single RGB image frame, unlike the learning process, and the bounding box information to calculate and output the coordinates of the keypoint ($y_i$) and a confident score for each coordinate by using only the convolutional pose machine.

Referring back to FIG. 4, the operation of determining the first estimated pose of the charging socket based on the depth map may include correcting the depth map (S320), deriving an equation of a plane of, e.g., a front face (but not limited thereto) of the charging socket based on a corrected depth map (S340), and deriving a transformation matrix through a rigid transformation (S360) to determine the first estimated pose of the charging socket.

Figure 9A:
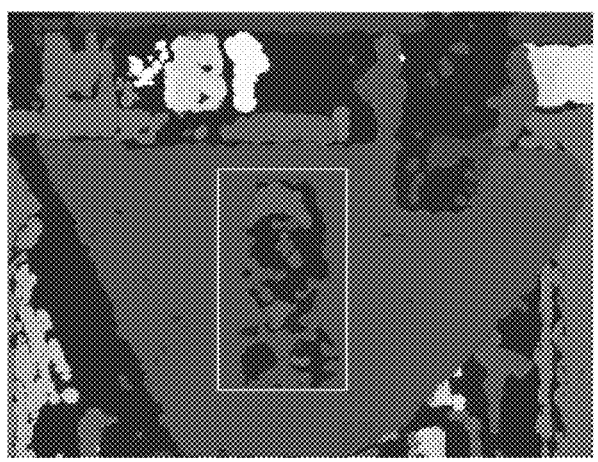
FIG. 9A is an example of a depth map before a correction according to an exemplary embodiment of the present disclosure.
Figure 9B:
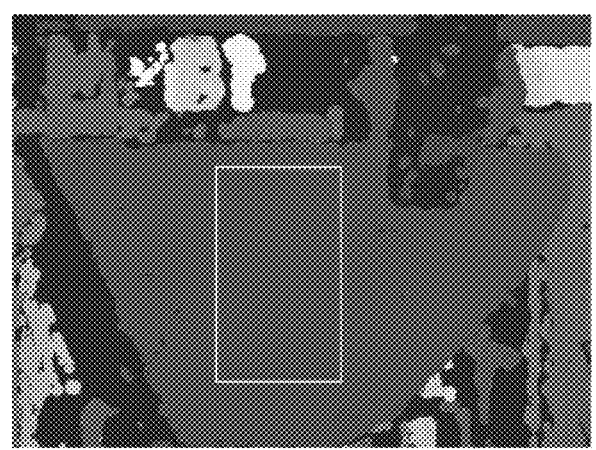
FIG. 9B is an example of a depth map after the correction according to an exemplary embodiment of the present disclosure.

FIG. 9A is an example of the depth map before the correction according to an exemplary embodiment of the present disclosure, and FIG. 9B is an example of the depth map after the correction according to an exemplary embodiment of the present disclosure. Referring to FIG. 9A, the depth map of the charging socket may be inaccurate due to a shape of the charging socket having a plurality of deep and dark inlets. To solve the problem, the depth map inside the bounding box may be corrected by performing interpolations based on depth values of points outside the bounding box (S320). For example, the depth map shown in FIG. 9A may be corrected through the interpolation to the depth map shown in FIG. 9B.

In the operation S340 of deriving the equation of the plane of the front face of the charging socket, the equation of the plane may be derived by sampling some points inside a corrected depth map and applying a least squares minimization method using coordinates of sampled points. The equation of the plane may be expressed by Equation 7, where denotes a normal vector of the plane.

$$ax + by + cz + d = 0, \hat{n} = (a, b, c) \qquad \text{[Equation 7]}$$

The equation of the plane may be expressed in a matrix form of Equation 8 to facilitate an application of the least squares minimization method, '$\hat{r}_i$' denotes a position vector of each pixel sampled in the corrected depth map image.

$$\begin{bmatrix} r_1 & 1 \\ r_2 & 1 \\ r_3 & 1 \\ \vdots & \vdots \end{bmatrix} \begin{bmatrix} a \\ b \\ c \\ d \end{bmatrix} = \begin{bmatrix} 0 \\ 0 \\ 0 \\ \vdots \end{bmatrix} \qquad \text{[Equation 8]}$$

The Equation 8 may be transformed into Equation 9 having a reduced dimension through a singular value decomposition (SVD), and the normal vector 'n̂' and a constant 'd' may be derived from a last column vector of the a unitary matrix 'V'.

$$Ax = 0 \rightarrow A = U\Sigma V^T \qquad \text{[Equation 9]}$$

Figure 10:
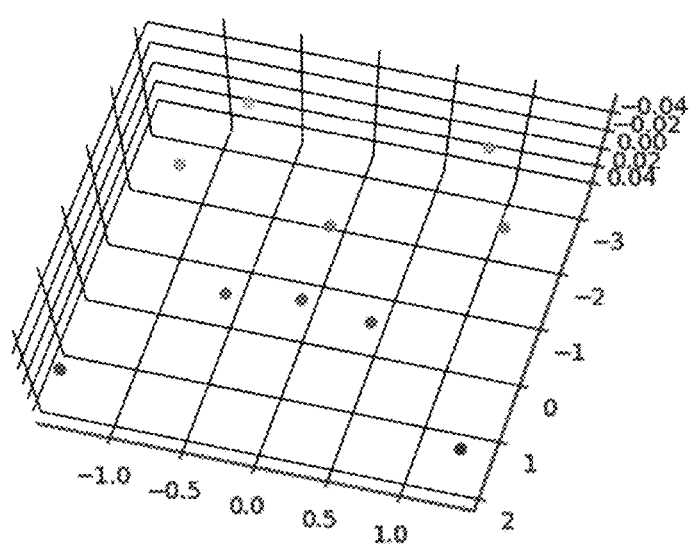
FIG. 10 is a graphical representation of examples of the reference coordinates according to an exemplary embodiment of the present disclosure.

The keypoint ($y_i$) may be projected onto the plane described above by using an internal parameter K of the camera, the normal vector n̂, and the constant d to obtain projected coordinates ($p_i$). Meanwhile, reference coordinates ($q_i$) which correspond to the keypoint ($y_i$) shown in FIG. 5B may be extracted from a CAD model of the charging socket. FIG. 10 is a graphical representation of examples of the reference coordinates according to an exemplary embodiment of the present disclosure.

In order to obtain a physical transformation relationship between the camera image and the charging socket, an initial transformation matrix ($R^o$, $t^o$) may be calculated through an operation of minimizing a third objective function expressed by Equation 10 which is written in terms of the projected coordinates ($p_i$) and the reference coordinates ($q_i$).

$$[R, t] = \underset{R,t}{\operatorname{argmin}} \sum_{i=1}^{n} w_i \|Rq_i + t - p_i\|^2 \qquad \text{[Equation 10]}$$

Referring back to FIG. 4, the operation of determining the second estimated pose by taking into account the keypoint (S400) may include a sensor integration-based pose estimation operation, i.e., determining the second estimated pose of the charging socket based on all the sensor information including the keypoint ($y_i$) and the first estimated pose. In the sensor integration-based pose estimation operation, the transformation matrix calculated by the Equation 10 is corrected and an optimal transformation matrix (R*, t*) is derived by minimizing a fourth objective function expressed by Equation 11 which is written in terms of the keypoint ($y_i$) and the reference coordinates ($q_i$) corresponding to the keypoint ($y_i$). At this time, the initial transformation matrix ($R^o$, $t^o$) may be used for the initial value for the optimal transformation matrix (R*, t*). Through the sensor integration-based pose estimation operation, the second estimated pose may be derived by correcting the first estimated pose to reduce an estimation error.

$$[R^*, t^*] = \underset{R^*, t^*}{\operatorname{argmin}} \sum_{i=1}^{n} \|K[R^* \mid t^*]q_i - y_i\|^2 \qquad \text{[Equation 11]}$$

Figure 11A:
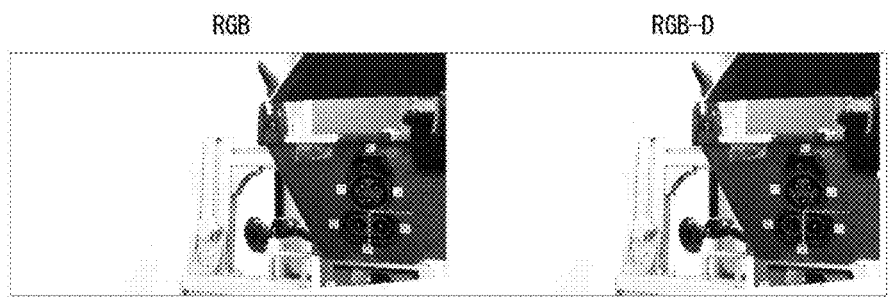
FIGS. 11A and 11B are examples of screenshots of a simulator estimating the pose of the charging socket by the estimation method according to an exemplary embodiment of the present disclosure.
Figure 11B:
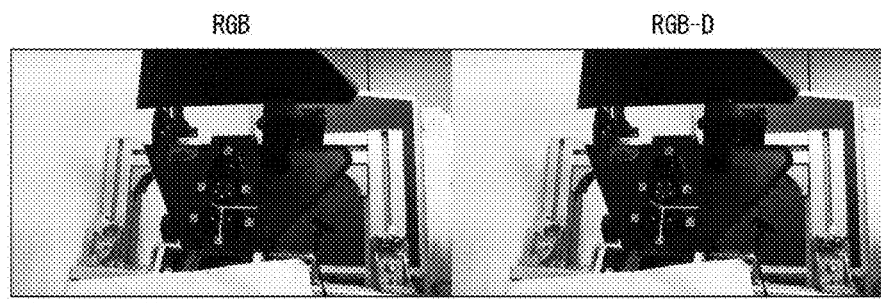

FIGS. 11A and 11B are examples of screenshots of a simulator estimating the pose of the charging socket by the estimation method according to an exemplary embodiment of the present disclosure. The pose of the charging socket may be estimated while translating or panning and/or tilting the charging socket. Alternatively, however, the pose of the charging socket may be estimated while moving the camera instead of the charging socket. In FIGS. 11A and 11B, the image in a central left portion is an image assumed to be acquired by an RGB camera, and the image in a central right portion is an image assumed to be acquired by an RGB-Depth (RGB-D) camera. Pitch and yaw values of the charging socket calculated based on the ground truth, the RGB image, and the RGB-D image may be displayed on a lower portion of a screen of the simulator. Tables 1 and 2 summarizingly show results of quantitative experiments for estimating the pose of the charging socket based on the 3D camera image with the results according to a conventional method. In the tables, the conventional method represents a method of estimating the pose using the RGB image only while the method of the present disclosure represents the method of estimating the pose using the RGB image along with the depth map.

TABLE 1

| | Mean Pitch Error (degree) | | | | | |
|---|---|---|---|---|---|---|
| | −20° | −10° | 0° | 10° | 20° | Avg. |
| Conventional | 1.58 | 2.35 | 3.22 | 4.81 | 3.63 | 3.12 |
| Present | 1.94 | 1.19 | 1.67 | 0.96 | 1.16 | 1.38 |

TABLE 2

| | Mean Yaw Error (degree) | | | | | |
|---|---|---|---|---|---|---|
| | −20° | −10° | 0° | 10° | 20° | Avg. |
| Conventional | 2.14 | 2.90 | 7.29 | 6.37 | 4.03 | 4.55 |
| Present | 1.31 | 1.74 | 1.65 | 0.92 | 0.92 | 1.31 |

Compared to the conventional method, the method of estimating the pose of the electric vehicle charging socket according to the present embodiment using the 3D camera image was found to reduce an average pitch error from 3.12 degrees to 1.38 degrees and reduce an average yaw error from 4.55 degrees to 1.31 degrees in an example.

Figure 12:
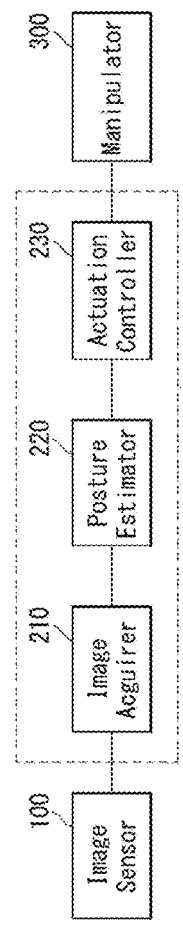
FIG. 12 is a functional block diagram of an autonomous electric vehicle charging robot according to an exemplary embodiment of the present disclosure.
Figure 13:
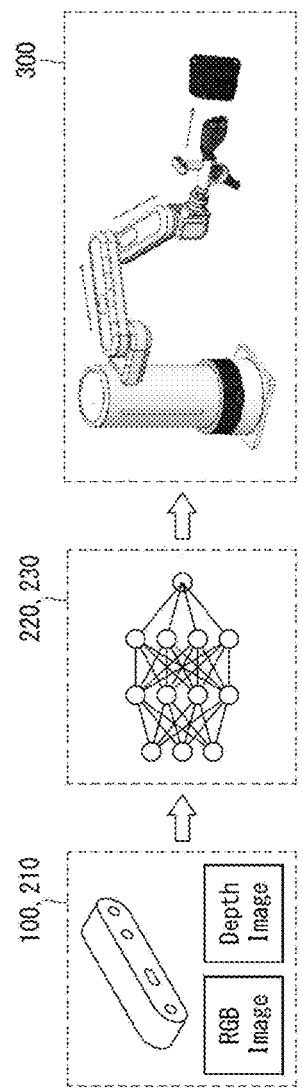
FIG. 13 is a schematic diagram depicting an overall function of the autonomous charging robot of FIG. 12.
Figure 14:
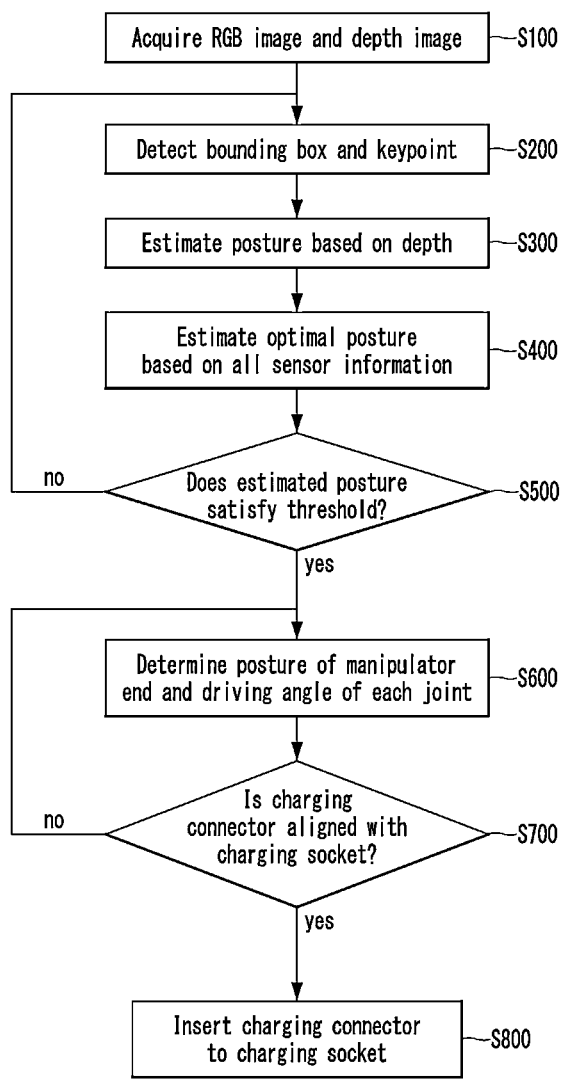
FIG. 14 is a flow chart showing an operation of the autonomous charging robot of FIG. 12.

FIG. 12 is a functional block diagram of an autonomous electric vehicle charging robot according to an exemplary embodiment of the present disclosure, FIG. 13 is a schematic diagram depicting an overall function of the autonomous charging robot, and FIG. 14 is a flow chart showing an operation of the autonomous charging robot.

The autonomous charging robot may include an image sensor 100, an image acquirer 210, a pose estimator 220, an actuation controller 230, and a manipulator 300. In an exemplary embodiment, the image acquirer 210, the pose estimator 220, and the actuation controller 230 may be implemented by a program instructions executed by a processor, but the present disclosure is not limited thereto. In one exemplary embodiment, a combination of the pose estimator 220 and the actuation controller 230 may be referred to as a robot controller. For example, the robot controller may include a processor and an associated non-transitory memory storing software instructions which, when executed by the processor, provides the functionalities of the pose estimator 220 and the actuation controller 230. The processor may take the form of one or more processor(s) and associated memory storing program instructions.

The image sensor 100 may acquire the RGB image and a depth map of the charging socket and its surroundings. Alternatively, the image sensor 100 may be a stereoscopic camera capable of acquiring a stereoscopic image of the charging socket and its surroundings.

The image acquirer 210 may acquire the RGB image and the depth map of the charging socket and its surroundings from the image sensor 100. In an exemplary embodiment, the image acquirer 210 may directly receive the RGB image and the depth map from the image sensor 100. In an alternative embodiment where the image sensor 100 acquires the stereoscopic image, the image acquirer 210 may receive the stereoscopic image from the image sensor 100 and generate the RGB image and the depth map from the stereoscopic image. The pose estimator 220 may estimate the pose of the charging socket from the RGB image and the depth map. The actuation controller 230 may control a movement of the manipulator 300, so that a charging connector provided at, e.g., a front end of the manipulator 300, but not limited thereto, may be aligned with the charging socket of the electric vehicle.

The manipulator 300 may be an articulated robot arm having six degrees of freedom, and may include a charging connector installed at, e.g., its front end. The image sensor 100 may be installed behind the charging connector on the manipulator 300. The manipulator 300 may align the charging connector to the charging socket of the electric vehicle and insert the charging connector into the charging socket under a control of the actuation controller 230 (S800).

Referring to FIG. 13, when the images around the socket is acquired through the image sensor 100, the pose estimator 220 estimates the pose of the charging socket through the artificial neural network. The actuation controller 230 may control the manipulator 300 based on the estimated pose of the charging socket, so that the charging connector may be aligned with the charging socket and inserted into the charging socket. In a state that the charging connector is inserted into the charging socket, the electric power may be supplied to the electric vehicle through the charging connector to charge a battery of the electric vehicle.

In detail, referring to FIG. 14, the image acquirer 210 may acquire the RGB image and the depth map with an assistance of the image sensor 100 (S100). The pose estimator 220 may detect the charging socket and the keypoint of the charging socket based on the RGB image and the depth map of the charging socket (S200), and may estimate the first estimated pose of the charging socket based on the depth map (S300). The pose estimator 220 may derive the second estimated pose by taking into account the keypoint of the charging socket and the first estimated pose of the charging socket (S400) using the optimally trained artificial neural network. The pose estimator 220 may determine whether the estimated pose of the charging socket satisfies a threshold and repeatedly estimate the pose of the charging socket until the threshold is satisfied (S500).

The actuation controller 230 may determine a driving angle of each joint of the manipulator 300 by calculating the pose of the front end of the manipulator 300 where the charging connector is installed (S600). In addition, the actuation controller 230 may adjust the driving angle of each joint of the manipulator 300 to translate or rotate the manipulator 300. The actuation controller 230 may determine whether the charging connector and the charging socket at the front end of the manipulator 300 are aligned with each other (S700), and repeat the operation S600 until the charging connector and the charging socket are aligned with each other. When the charging connector is aligned with the charging socket of the electric vehicle, the manipulator 300 may insert the charging connector into the charging socket under the control of the actuation controller 230 (S800).

Figure 15:
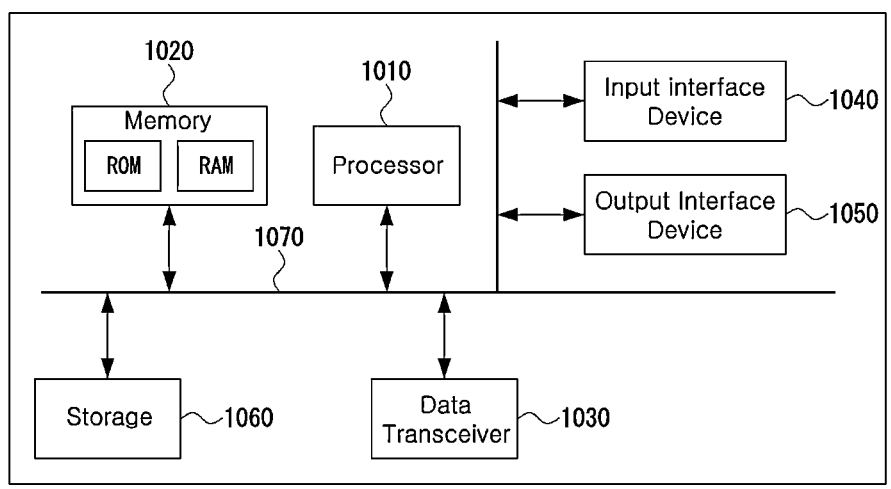
FIG. 15 is a physical block diagram of the autonomous electric vehicle charging robot according to an exemplary embodiment of the present disclosure.

FIG. 15 is a physical block diagram of the autonomous electric vehicle charging robot according to an exemplary embodiment of the present disclosure.

The electric vehicle charging robot according to the present embodiment may include at least one processor 1010, a memory 1020 storing program instructions to be executed by the processor 1010 and a result of an instruction execution, and a storage 1060. The autonomous electric vehicle charging robot may further include an input interface device 1040, an output interface device 1050, and a data transceiver 1030. The components of the electric vehicle charging robot may be connected to each other by a bus 1070.

The program instructions stored in the storage 1060 may be configured to cause the processor 1010 to acquire the RGB image and the depth map of the charging socket, detect the keypoint of the charging socket based on the RGB image, derive the first estimated pose of the charging socket based on the depth map, and derive the second estimated pose of the charging socket based on the keypoint of the charging socket and the first estimated pose.

The program instructions may cause the processor 1010 to acquire the RGB image and the depth map with the assistance of the image sensor, detect the charging socket and the keypoint of the charging socket based on the RGB image of the charging socket, estimate the first estimated pose of the charging socket based on the depth map, derive the second estimated pose by taking into account the keypoint and the first estimated pose of the charging socket using the optimally trained artificial neural network, determine whether the estimated pose of the charging socket satisfies a threshold to repeatedly estimate the pose of the charging socket until the threshold is satisfied, determine the driving angle of each joint of the manipulator by calculating the pose of the front end of the manipulator where the charging connector is installed, adjust the driving angle of each joint of the manipulator to translate or rotate the manipulator, determine whether the charging connector and the charging socket are aligned with each other, repeat the adjustment of the driving angle until the charging connector and the charging socket are aligned with each other, and control the manipulator to insert the charging connector into the charging socket when the charging connector is aligned with the charging socket.

The processor 1010 may execute program instructions stored in the memory 1020 or the storage 1060. The processor 1010 may include a central processing unit (CPU) or a graphics processing unit (GPU), or may be implemented by another kind of dedicated processor suitable for performing the method of the present disclosure. The memory 1020 may load the program instructions stored in the storage 760 to provide to the processor 1010 so that the processor 1010 may execute the program instructions. The memory 1020 may include, for example, a volatile memory such as a read only memory (ROM) and a nonvolatile memory such as a random access memory (RAM).

The storage 1060 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of controlling an autonomous electric vehicle charging robot, the method comprising:
   acquiring, by an image sensor, an RGB image and a depth map of a charging socket of an electric vehicle;
   detecting, by a processor, keypoints of the charging socket based on the RGB image;
   deriving, by the processor, a first estimated pose of the charging socket based on the depth map;
   deriving, by the processor, a second estimated pose of the charging socket based on the keypoints of the charging socket and the first estimated pose; and
   driving a charging connector of the autonomous electric vehicle charging robot according to the second estimated posture of the charging socket so that the charging connector is moved to be aligned with the charging socket and is inserted into the charging socket,
   wherein the deriving the first estimated pose of the charging socket comprises:
     correcting the depth map of the charging socket by interpolating the depth map;
     deriving an equation of a plane of the charging socket by sampling a plurality of internal points inside a corrected depth map;
     projecting the keypoints of the charging socket onto the plane represented by the equation to acquire projection coordinates;
     acquiring reference coordinates ($q_i$) corresponding to the projection coordinates ($p_i$) from a CAD model of the charging socket; and
     acquiring an initial transformation matrix describing the first estimated pose and minimizing differences between the projection coordinates ($p_i$) and the reference coordinates ($q_i$), wherein the deriving the second estimated pose of the charging socket comprises:
deriving an optimal transformation matrix describing the second estimated pose, comprising an optimal rotation matrix and an optimal translation vector, and minimizing differences between coordinates of the keypoints ($y_i$) and the reference coordinates ($q_i$) corresponding to the keypoints.

2. The method of claim 1, wherein the detecting the keypoints of the charging socket based on the RGB image comprises:
detecting a bounding box surrounding the charging socket, calculating a confidence score for coordinates of the bounding box, and determining a class indicating a type of the charging socket by a learnable charging socket detection neural network; and
detecting the keypoints inside a charging socket region in the bounding box by a learnable keypoint detection neural network.

3. The method of claim 2, wherein the charging socket detection neural network comprises a MobileNetV3 as a backbone and a MnasFPN as a detection head.

4. The method of claim 2, wherein the detecting the bounding box surrounding the charging socket comprises:
removing at least one bounding box overlapping another bounding box among a plurality of bounding boxes detected by the charging socket detection neural network by a non-maximum suppression.

5. The method of claim 2, wherein the keypoint detection neural network detects the keypoints based on a single RGB image and the bounding box by using only a convolutional pose machine during an actual operation after a learning.

6. The method of claim 1, wherein the initial transformation matrix is determined by a following equation:

$$[R, t] = \operatorname*{argmin}_{R,t} \sum_{i=1}^{n} w_i \|Rq_i + t - p_i\|^2$$

where '$p_i$' denotes the projection coordinates, '$q_i$' denotes the reference coordinates corresponding to the projection coordinates, 'R' and 't' denote a rotation matrix and a translation vector, respectively, of the initial transformation matrix, and '$w_i$' denotes weights for respective pairs of the projection coordinates and the reference coordinates.

7. The method of claim 6, wherein the optimal transformation matrix is determined by a following equation:

$$[R^*, t^*] = \operatorname*{argmin}_{R^*, t^*} \sum_{i=1}^{n} \|K[R^* \mid t^*]q_i - y_i\|^2$$

where '$y_i$' denotes coordinates of the keypoints in the RGB image corresponding to the reference coordinates, 'R*' and 't*' denote the optimal rotation matrix and the optimal translation vector, respectively, of the optimal transformation matrix, and 'K' denotes a camera intrinsic parameter.

8. A device for controlling an autonomous electric vehicle charging robot, comprising:
a processor; and
a memory storing program instructions executable by the processor,
wherein the program instructions, when executed by the processor, cause the processor to:
acquire an RGB image and a depth map of a charging socket of an electric vehicle;
detect keypoints of the charging socket based on the RGB image;
derive a first estimated pose of the charging socket based on the depth map;
derive a second estimated pose of the charging socket based on the keypoints of the charging socket and the first estimated pose; and
drive a charging connector of the autonomous electric vehicle charging robot according to the second estimated posture of the charging socket so that the charging connector is moved to be aligned with the charging socket and is inserted into the charging socket,
wherein the program instructions causing the processor to derive the first estimated pose of the charging socket comprises program instructions causing the processor to:
correct the depth map of the charging socket by interpolating the depth map;
derive an equation of a plane of the charging socket by sampling a plurality of internal points inside a corrected depth map;
project the keypoints of the charging socket onto the plane represented by the equation to acquire projection coordinates;
acquire reference coordinates ($q_i$) corresponding to the projection coordinates ($p_i$) from a CAD model of the charging socket; and
acquire an initial transformation matrix describing the first estimated pose and minimizing differences between the projection coordinates ($p_i$) and the reference coordinates ($q_i$),
wherein the program instructions causing the processor to derive the second estimated pose of the charging socket comprises program instructions causing the processor to:
derive an optimal transformation matrix describing the second estimated pose, comprising an optimal rotation matrix and an optimal translation vector, and minimizing differences between coordinates of the keypoints ($y_i$) and the reference coordinates ($q_i$) corresponding to the keypoints.

9. The device of claim 8, wherein the program instructions causing the processor to detect the keypoints of the charging socket based on the RGB image comprises program instructions causing the processor to:
detect a bounding box surrounding the charging socket, calculate a confidence score for coordinates of the bounding box, and determine a class indicating a type of the charging socket by a learnable charging socket detection neural network; and
detect the keypoints inside a charging socket region in the bounding box by a learnable keypoint detection neural network.

10. The device of claim 9, wherein the charging socket detection neural network comprises a MobileNetV3 as a backbone and a MnasFPN as a detection head.

11. The device of claim 9, wherein the program instructions causing the processor to detect the bounding box surrounding the charging socket comprises program instructions causing the processor to:

remove at least one bounding box overlapping another bounding box among a plurality of bounding boxes detected by the charging socket detection neural network by a non-maximum suppression.

12. The device of claim 9, wherein the keypoint detection neural network detects the keypoints based on a single RGB image and the bounding box by using only a convolutional pose machine during an actual operation after a learning.

13. The device of claim 8, wherein the
initial transformation matrix is determined by a following equation:

$$[R, t] = \operatorname*{argmin}_{R,t} \sum_{i=1}^{n} w_i \|Rq_i + t - p_i\|^2$$

where '$p_i$' denotes the projection coordinates, '$q_i$' denotes the reference coordinates corresponding to the projection coordinates, 'R' and 't' denote a rotation matrix and a translation vector, respectively, of the initial transformation matrix, and '$w_i$' denotes weights for respective pairs of the projection coordinates and the reference coordinates.

14. The device of claim 13, wherein the
optimal transformation is determined by a following equation:

$$[R^*, t^*] = \operatorname*{argmin}_{R^*, t^*} \sum_{i=1}^{n} \|K[R^* \mid t^*]q_i - y_i\|^2$$

where '$y_i$' denotes coordinates of the keypoints in the RGB image corresponding to the reference coordinates, '$R^*$' and '$t^*$' denote an optimal rotation matrix and an optimal translation vector, respectively, of the optimal transformation matrix, and 'K' denotes a camera intrinsic parameter.

15. An autonomous electric vehicle charging robot, comprising:
a manipulator having six degrees of freedom and configured to be controllable to insert a charging connector into a charging socket of an electric vehicle;
an image acquirer configured to acquire an RGB image and a depth map of the charging socket; and
a robot controller configured to estimate a pose of the charging socket, determine a driving angle of each joint of the manipulator based on an estimated pose of the charging socket, determine whether the charging connector and the charging socket are aligned with each other, and control the manipulator to insert the charging connector into the charging socket,
wherein the robot controller comprises:
a processor and a memory storing program instructions executable by the processor, wherein the program instructions, when executed by the processor, cause the processor to:
detect keypoints of the charging socket based on the RGB image;
correct the depth map of the charging socket by interpolating the depth map;
derive an equation of a plane of the charging socket by sampling a plurality of internal points inside a corrected depth map;
project the keypoints of the charging socket onto the plane represented by the equation to acquire projected coordinates;
acquire reference coordinates (gi) corresponding to the projection coordinates ($p_i$) from a CAD model of the charging socket;
acquire an initial transformation matrix describing a first estimated pose and minimizing differences between the projection coordinates ($p_i$) and the reference coordinates ($q_i$); and
derive a second estimated pose of the charging socket as the pose of the charging socket based on the keypoints of the charging socket and the first estimated pose by determining an optimal transformation matrix which describes the second estimated pose, comprises an optimal rotation matrix and an optimal translation vector, and minimizes differences between coordinates of the keypoints ($y_i$) and the reference coordinates ($q_i$) corresponding to the keypoints.

16. The autonomous electric vehicle charging robot of claim 15, wherein the program instructions causing the processor to detect the keypoints of the charging socket based on the RGB image comprises program instructions causing the processor to:
detect a bounding box surrounding the charging socket, calculate a confidence score for coordinates of the bounding box, and determine a class indicating a type of the charging socket by a learnable charging socket detection neural network; and
detect the keypoints inside a charging socket region in the bounding box by a learnable keypoint detection neural network.

17. The autonomous electric vehicle charging robot of claim 16, wherein the charging socket detection neural network comprises a MobileNetV3 as a backbone and a MnasFPN as a detection head.

18. The autonomous electric vehicle charging robot of claim 16, wherein the program instructions causing the processor to detect the bounding box surrounding the charging socket comprises program instructions causing the processor to:
remove at least one bounding box overlapping another bounding box among a plurality of bounding boxes detected by the charging socket detection neural network by a non-maximum suppression.

19. The autonomous electric vehicle charging robot of claim 15, wherein the
initial transformation matrix is determined by a following equation:

$$[R, t] = \operatorname*{argmin}_{R,t} \sum_{i=1}^{n} w_i \|Rq_i + t - p_i\|^2$$

where '$p_i$' denotes the projection coordinates, '$q_i$' denotes the reference coordinates corresponding to the projection coordinates, 'R' and 't' denote a rotation matrix and a translation vector, respectively, of the initial transformation matrix, and '$w_i$' denotes weights for respective pairs of the projection coordinates and the reference coordinates.

* * * * *